US009518621B2

(12) United States Patent
Andersson (10) Patent No.: US 9,518,621 B2
(45) Date of Patent: Dec. 13, 2016

(54) CLUTCH ARRANGEMENT COMPRISING A SHIFT PISTON AND A PISTON HOUSING

(71) Applicant: VOLVO CONSTRUCTION EQUIPMENT AB, Eskilstuna (SE)

(72) Inventor: Thomas Andersson, Eskilstuna (SE)

(73) Assignee: Volvo Construction Equipment AB, Eskilstuna (SE)

( * ) Notice: Subject to any disclaimer, the term of this patent is extended or adjusted under 35 U.S.C. 154(b) by 0 days.

(21) Appl. No.: 14/440,618

(22) PCT Filed: Dec. 21, 2012

(86) PCT No.: PCT/SE2012/000217
§ 371 (c)(1),
(2) Date: May 5, 2015

(87) PCT Pub. No.: WO2014/098657
PCT Pub. Date: Jun. 26, 2014

(65) Prior Publication Data
US 2015/0292571 A1    Oct. 15, 2015

(51) Int. Cl.
F16D 25/08    (2006.01)
F16H 63/30    (2006.01)
(Continued)

(52) U.S. Cl.
CPC ............. F16D 25/083 (2013.01); F16D 11/10 (2013.01); F16H 63/02 (2013.01);
(Continued)

(58) Field of Classification Search
CPC ................... F16D 2048/0257; F16D 2011/004; F16D 25/061; F16H 63/02
See application file for complete search history.

(56) References Cited

U.S. PATENT DOCUMENTS 3,024,885 A * 3/1962 Dence ................... F16D 23/04
                                                 192/48.613
4,044,869 A    8/1977 Gros
(Continued)

FOREIGN PATENT DOCUMENTS

DE            4204883 C1    9/1993
DE           19939201 A1    2/2001
(Continued)

OTHER PUBLICATIONS

International Search Report (Sep. 9, 2013) for corresponding International App. PCT/SE2012/000217.
(Continued)

*Primary Examiner* — Mark Manley
(74) *Attorney, Agent, or Firm* — WRB-IP LLP (57) ABSTRACT

A clutch arrangement includes a shift piston and a piston housing. The shift piston is arranged to be displaced in an axial direction relative to the piston housing between at least one gear position and a neutral position. The clutch arrangement also includes a spring element for forcing the shift piston towards the neutral position. The clutch arrangement includes a first return piston and a second return piston arranged on opposite sides of the spring element, and the spring element is accommodated within a recess of the shift piston and is pretensioned between the first return piston and the second return piston. In the neutral position the first return piston is forced by the spring element against a first stop element of the shift piston, defining an end position for the first return piston relative to the shift piston, and the second return piston is forced by the spring element against a second stop element of the shift piston, defining an end position for the second return piston relative to the shift piston.

15 Claims, 6 Drawing Sheets

(51) Int. Cl.
*F16H 63/02*     (2006.01)
*F16D 11/10*     (2006.01)
F16D 25/061    (2006.01)
F16D 11/00     (2006.01)

(52) U.S. Cl.
CPC ....... *F16H 63/3026* (2013.01); *F16D 25/061* (2013.01); *F16D 2011/004* (2013.01); *F16D 2300/14* (2013.01)

(56) References Cited

U.S. PATENT DOCUMENTS 4,611,506 A  9/1986 Groothius
6,315,691 B1 * 11/2001 Fredriksen ............ F16D 25/061
                                                          192/48.613

FOREIGN PATENT DOCUMENTS

| DE | 10103726 A1 | 8/2002 |
| DE | 102011007320 A1 | 10/2012 |
| GB | 2071794 A | 9/1981 |
| WO | 8301089 A1 | 3/1983 |

OTHER PUBLICATIONS

International Preliminary Report on Patentability (Nov. 27, 2014) for corresponding International App. PCT/SE2012/000217.

* cited by examiner

CLUTCH ARRANGEMENT COMPRISING A SHIFT PISTON AND A PISTON HOUSING

BACKGROUND AND SUMMARY

The present invention relates to a clutch arrangement comprising a shift piston and a piston housing, said shift piston being arranged to be displaced in an axial direction relative to the piston housing between at least one gear position and a neutral position, the clutch arrangement further comprising a spring element for forcing the shift piston towards said neutral position.

The invention is applicable on vehicles, for example working machines within the fields of industrial construction machines, such as wheel loaders and articulated haulers. The invention is however not restricted to these particular machines, but may also be used in other construction equipment or in other vehicles, such as a truck or similar. In particular, the invention is applicable on a dog clutch transmission for transmitting power from a hub motor to a wheel.

Various clutch arrangements are known in order to couple rotating elements to each other so as to transmit power from one element to another element.

In the field of automotive transmission devices, it is known to use a so-called dog clutch, which is an arrangement used to connect two rotating elements, such as for example rotating shafts. More precisely, a dog clutch is arranged for coupling together a set of evenly spaced teeth, so-called "dogs", on one part of the clutch arrangement to a corresponding set of teeth on the other part of the clutch arrangement. In this manner, the shafts can be coupled together so as to transfer rotational power from one shaft to another.

In contrast to certain other clutches which are based on power transfer via friction between two parts, the dog clutch operates by coupling two parts together without any slip so that they rotate together at the same speed.

Furthermore, an actuating device in the form of a shift piston can be used so as to be displaced for actuating the dog clutch in a manner so that it assumes an engaged or disengaged condition.

In order to engage and lock the two rotating parts of a dog clutch, a so-called synchromesh device can be used in order to match and synchronize the rotational speeds of the rotating shafts before the dog clutch is coupled.

A clutch arrangement is known from the patent document U.S. Pat. No. 4,044,869, which discloses a lamellae disc clutch arrangement for selecting between a forward and a reverse gear position, and also a neutral position. The clutch arrangement is operated by means of a hydraulically operated shift actuator which is arranged in a housing and which can be retained in its neutral position by means of a spring arrangement. The forward and reverse gears can be selected by applying liquid pressure to the shift actuator.

In certain applications in the field of vehicle transmissions, there is a particular need for a dog clutch arrangement which can operate with a highly accurate and precise neutral position. This is important since it may allow for a relatively quick shifting, i.e. a short shifting time when actuating the shift piston so as to shift between gears. There is also a need for a dog clutch arrangement which may fulfil requirements regarding safety, in particular so that it may assume a neutral position in the event of a failure such as a loss of fluid pressure for actuating the shift piston.

It is desirable to provide a clutch arrangement comprising a shift piston by means of which a more precise neutral position and relatively quick shifting times can be obtained.

In accordance with an aspect of the invention, a clutch arrangement comprises a first return piston and a second return piston arranged on opposite sides of said spring element, and said spring element is accommodated within a recess of said shift piston and is pretensioned between the first return piston and the second return piston, wherein in said neutral position the first return piston is forced by the spring element against a first stop element of the shift piston, defining an end position for the first return piston relative to the shift piston, and the second return piston is forced by the spring element against a second stop element of the shift piston, defining an end position for the second return piston relative to the shift piston.

The shift piston carries a pre-tensioned spring which is arranged between said first return piston and said second return piston. In this manner, the spring together with the return pistons strive to position the shift piston in a well-defined neutral position. This means that possible deficiencies or variations in the properties and operation of the spring element do not affect the accuracy or position of the shift position in said neutral position. In other words, a very precise neutral position can be achieved which in turn means that the clutch arrangement according to the invention may be designed so as to allow a very short gear shifting time, which is an advantage in many applications of the invention. The neutral position is defined as a condition in which both the first and second return pistons are forced by said spring element to assume their respective end position. This means that the neutral position can be determined with high accuracy and that other parameters, such as for example the spring force of the spring (springs), are not decisive as regards the positioning and tolerances related to the neutral position.

The spring (or springs) will thus aid in quickly changing from an engaged gear to a neutral position as well as keeping the actuating piston steadily in a neutral position. Also, in certain applications, there is a requirement to provide a dog clutch which allows certain safety functions, for example in a situation in which a mechanical transmission is combined with an electric drive. In such a case, it is necessary to provide a possibility to disengage the dog clutch in an efficient manner if for example an electrical control system malfunctions. According to the invention, the shift piston will move to the neutral position in the event of a loss of pressure of the hydraulic system and is thus easily and securely placed in neutral if the pressure is relieved. This is an important safety feature of the invention.

According to an embodiment, the shift piston is hydraulically actuated and the clutch arrangement is provided with a first inlet for hydraulic fluid extending through said piston housing. In this manner, the shift piston can be forced towards the first axial position by means of the hydraulic fluid. Also, the clutch arrangement can be provided with a second inlet for hydraulic fluid extending through said piston housing and forcing the shift piston towards its second axial position by means of the hydraulic fluid. Also, the embodiment may comprise a third inlet for hydraulic fluid arranged in the piston housing, so that the fluid can be fed into the internal recess in order to force the shift piston towards said neutral position.

The arrangement according to the invention can be applied in different types of clutches but is preferably applied to a dog clutch.

BRIEF DESCRIPTION OF DRAWINGS

The invention will be described below with reference to an embodiment and the appended drawings, in which.

DETAILED DESCRIPTION

Figure 1:
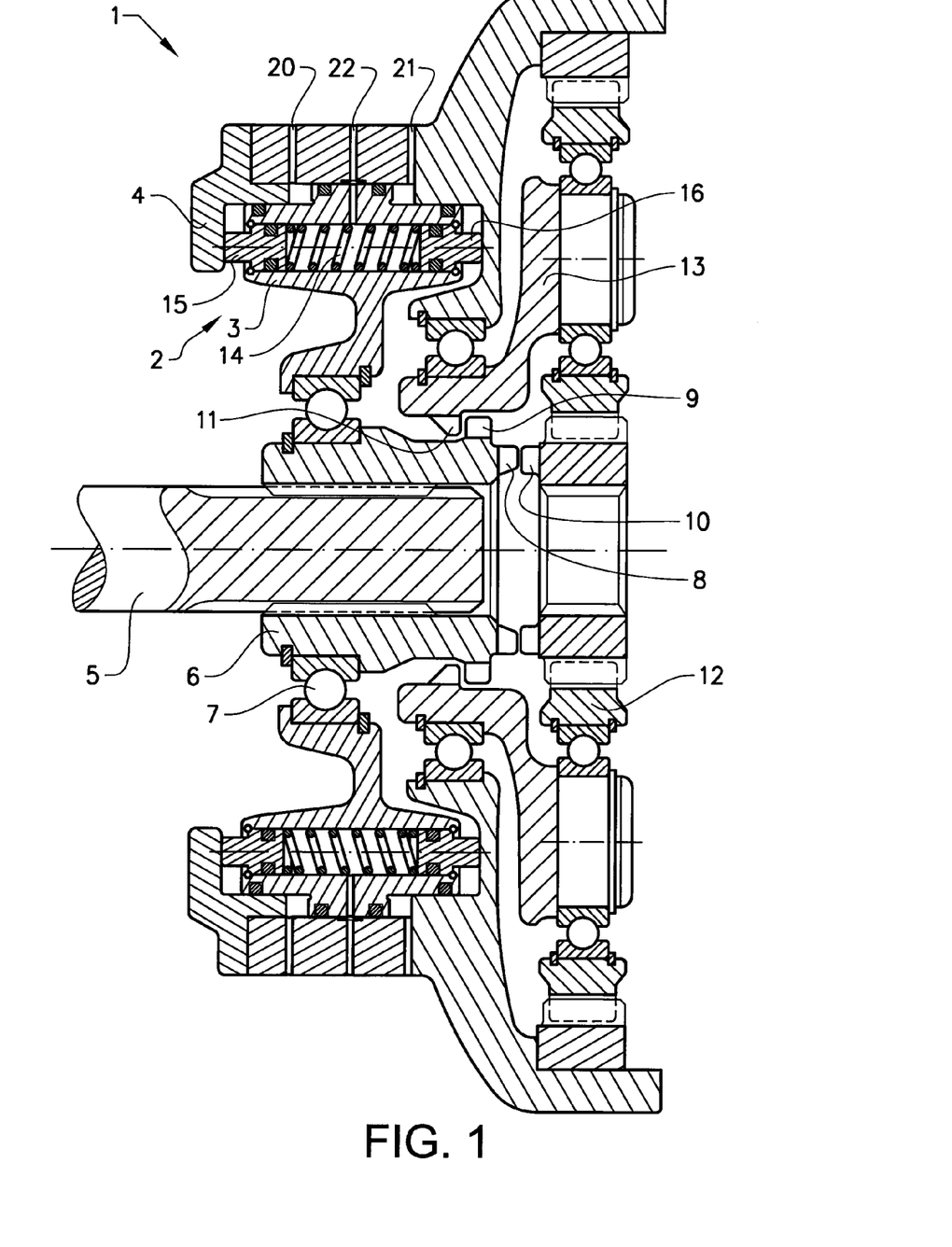
FIG. 1 shows a cross-sectional view of a transmission unit with a clutch arrangement according to the present invention.

FIG. 1 is a cross-sectional view which illustrates a transmission unit 1 which is provided with a clutch arrangement 2 according to the present invention.

According to an embodiment, the invention can be used in transmission units for electrical motors which can be positioned in wheel hubs of heavy construction vehicles, but obviously the invention is not limited to such use only but can also be used in other applications.

As shown in FIG. 1, the clutch arrangement 2 according to the illustrated embodiment comprises a shift piston 3 which is arranged in a piston housing 4. The shift piston 3 is arranged to be displaced in an axial direction relative to the housing. In the illustrated embodiment the axial direction is the same direction as the extension of a shaft 5 an which a gearwheel 6 is mounted. The shift piston 3 is preferably annular and extends around the longitudinal axis of the shaft 5. In the embodiment illustrated in FIG. 1, the shift piston is arranged on the gear wheel via a bearing arrangement 7. The gearwheel 6 is provided with a first set of teeth 8, or "dogs", and is also provided with a second set of teeth 9. When displacing, the shift piston 3, the gearwheel 6—with its first set of teeth 8—can be engaged with a third set of teeth 0 which defines a first gear.

The clutch 2 arrangement can also assume a second gear if the shift piston 3 is axially displaced in the opposite direction so that the second set of teeth 9 is engaged together with a fourth set of teeth 1. The third set of teeth 10 forms part of a second gearwheel 12 and the fourth set of teeth 11 forms part of a third gearwheel 13. In this manner, the shift piston 3 can be arranged to define a first gear position and second gear position.

Also, as actually shown in FIG. 1, the shift piston 3 can assume a third position, i.e. a neutral position, in which no gear is engaged and neither one of the first set of teeth 8 and the second set of teeth 9 is engaged with the corresponding third and fourth set of teeth 10, 11, respectively.

The structure and operation of the shift piston 3 will now be described in greater detail with reference to FIG. 2, which is a cross-sectional view of a part of the clutch arrangement 2 which accommodates the shift piston 3.

Figure 2:
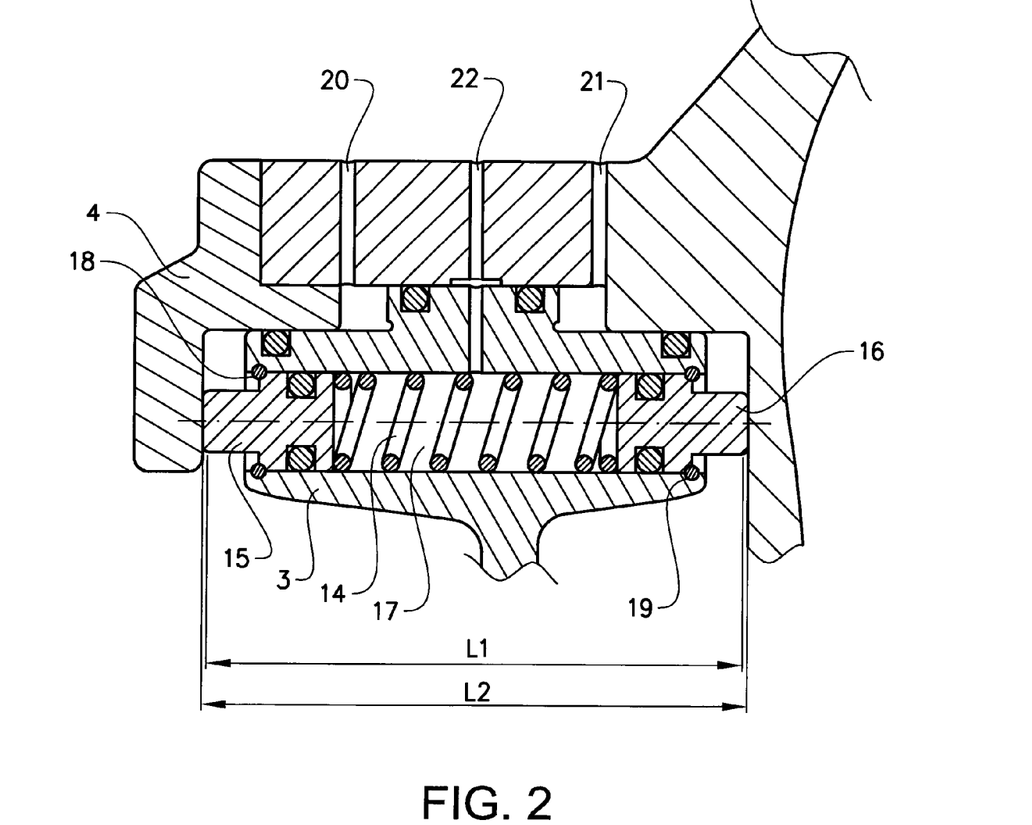
FIG. 2 is a cross-sectional view showing a slightly enlarged view of a section of said clutch arrangement.

In FIG. 2 the shift piston 3 is held in its neutral position. To this end, the clutch arrangement 2 comprises a spring element 14, suitably in the form of a helical spring. The spring element 14 is arranged for forcing the shift piston 3 towards the neutral position by acting upon a first return piston 15 and a second return piston 16. Both return pistons 15, 16 and the spring element 14 are arranged inside a recess 17, which is formed in the shift piston 3, and are slidable along the extension of the recess 17 in the axial direction. In the embodiment illustrated in FIG. 2, the first return piston 15 is forced by the spring element 14 in a first axial direction (to the left in FIG. 2), and the second return piston 16 is forced by the spring element 14 in a opposite axial direction (to the right in FIG. 2).

The first return piston 15 is preferably cylindrical and has preferably a section of smaller diameter than the rest of said first return piston 15, and cooperates with a first locking element or surface, such as a first locking ring 18, which consequently prevents the first return piston 15 from being forced out of the recess 17. In a similar manner, the second return piston 16 is preferably cylindrical and has preferably a section with smaller diameter than the rest of the second return piston 16. Also, a second stop element or surface, such as a second locking ring 19, is arranged to prevent the second return piston 16 from being forced out of the recess 17. Each one of the first locking ring 18 and the second locking ring 19 can be mounted in a corresponding groove in the inner surface of the recess 17.

Consequently, the spring element 14 is accommodated within the recess 17 of the shift piston 3 and is also pretensioned between the first return piston 15 and the second return piston 16. These return pistons 15, 16 are arranged on each side of the spring element 15 so that they are axially positioned close to the piston housing 4, i.e. they are forced in a direction towards two opposing interior walls in the piston housing 4 which face each other, however without contacting said opposing interior walls, at least not at the same time. In this manner, the shift piston 3 assumes the above-mentioned neutral position.

According to the illustrated embodiment, the shift piston 3 is hydraulically actuated, although the invention can generally be implemented with another pressure medium, such as pressurized air, in order to actuate the shift piston 3. According to a further example, the shift piston 3 can be mechanically actuated.

According to the embodiment shown in FIG. 2, the shift piston 3 is formed with a first inlet 20 for hydraulic fluid. This first inlet 20 extends through the piston housing 4 so as to allow hydraulic fluid to enter it and force the shift piston 3 towards a first axial position in which the shift piston 3 is displaced (in the right direction in FIG. 2) towards an interior wall of the piston housing 4. Furthermore, the shift piston 3 is formed with a second inlet 21 for hydraulic fluid, said second inlet 21 extending through the piston housing 4 so as to allow hydraulic fluid to enter it and force the shift piston 3 towards a second axial position (in the left direction in FIG. 2).

Figure 3:
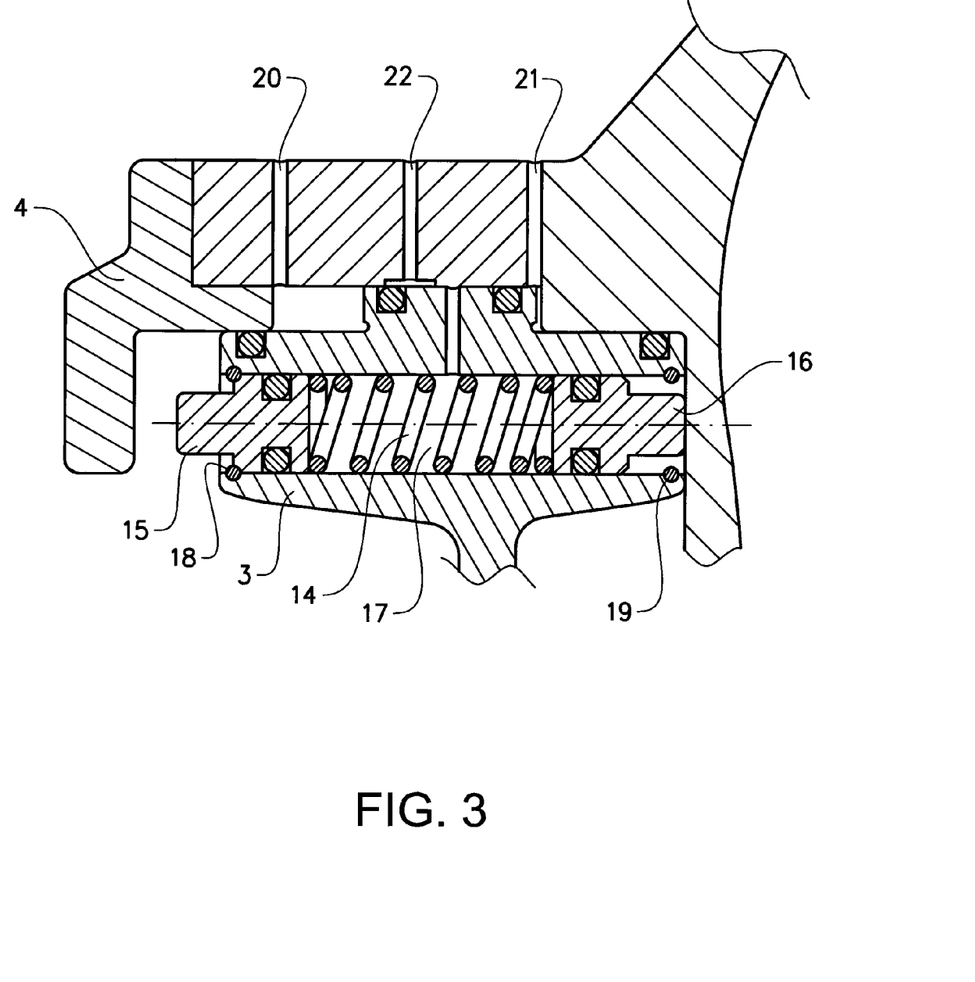
FIG. 3 is a cross-sectional view based on FIG. 2 but showing the clutch arrangement in a further position in which the shift piston has been displaced axially to assume a position in which it meshes with a first gear.

FIG. 3 corresponds generally to FIG. 2 but shows the shift piston 3 in the above-mentioned first axial position, i.e. corresponding to a first gear. In this position, the shift piston 3 has been forced, due to the hydraulic fluid fed through the first inlet 20, towards an interior wall of the piston housing 4. During this displacement, the second return piston 16 has been forced towards the interior of the recess 17, i.e. against the spring force of the spring element 14. Also, the first return piston 15 has been displaced a certain distance away from the opposing interior wall of the piston housing 4.

Although not shown in the drawings, the shift piston 3 may assume a second axial position as a result of hydraulic fluid being fed through the second inlet 21. In this second axial position, the shift piston 3 has been displaced in an opposite manner so as to abut the opposing (left) interior wall of the piston housing 4.

When no fluid is present in either one of the first inlet 20 or the second inlet 21, the shift piston 3 is allowed to assume its neutral position as shown in FIG. 2. This is obtained through the force of the spring element 14, which forces the return pistons 15, 16 towards their respective end position in which the first return piston 15 and the second return piston 16, respectively, are forced against the first and second stop elements, which here are the first locking ring 18 and second locking ring 19, respectively. In this regard, the spring element 14 must be sufficiently strong to overcome any force resulting from hydraulic fluid being inside the first inlet 20 and the second inlet 21.

Optionally the shift piston 3 can be provided with a third inlet 22 for hydraulic fluid arranged in said piston housing 4. When fluid is fed into the third inlet 22, the pressure of such fluid will add to the force of the spring element 14 in order to increase the pressure acting upon the first return piston 15 and the second return piston 16.

Figure 4:
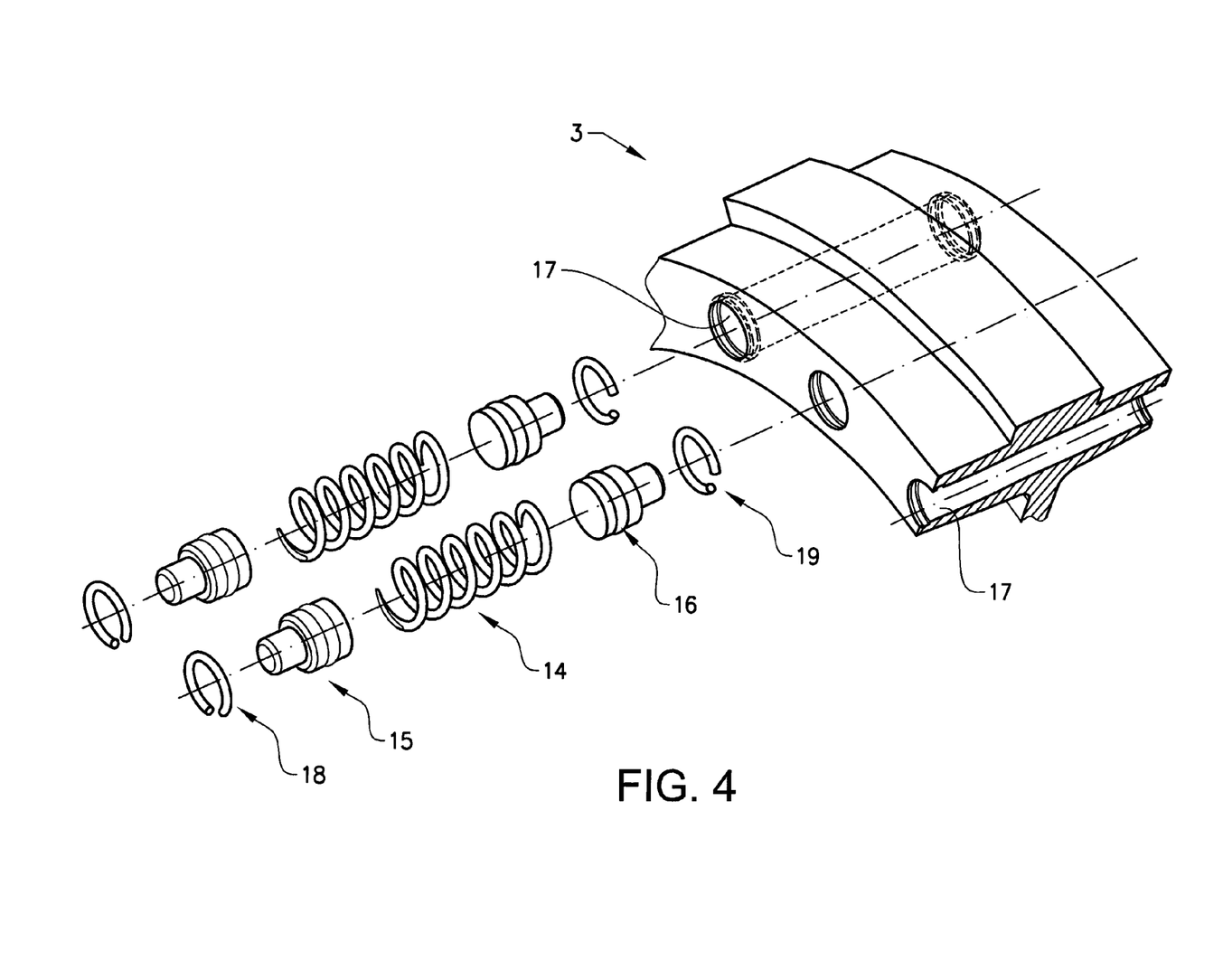
FIG. 4 is a perspective view of certain parts of the invention shown in a disassembled condition.

FIG. 4 is a perspective view of certain parts of the invention. More specifically, FIG. 4 shows the manner in which the invention can be arranged with one or more recesses 17 which are arranged around the circumference of the shift piston 3. For this purpose, the shift piston 3 is preferably annular. Also, although not shown in detail in FIG. 3, each one of the recesses 17 is provided with inlets for hydraulic liquid, in a manner which is similar to that shown in FIG. 2.

For reasons of simplicity, FIG. 4 shows three such recesses 17, but it should be noted that for example four, eight or any number of recesses 17 could be arranged along the circumference of the shift piston 3. Suitably, the recesses 17 are arranged at equal distance from each other. Also, a first return piston 15 and a second return piston 16 are positioned in a corresponding recess 17. The first return piston 15 is kept in place within the recess 7 by means of a first locking ring 18, and the second return piston 16 is kept in place by means of a second locking ring 19. Also, a spring element 14 is arranged between each set of a first return piston 15 and second return piston 16.

Figure 5:
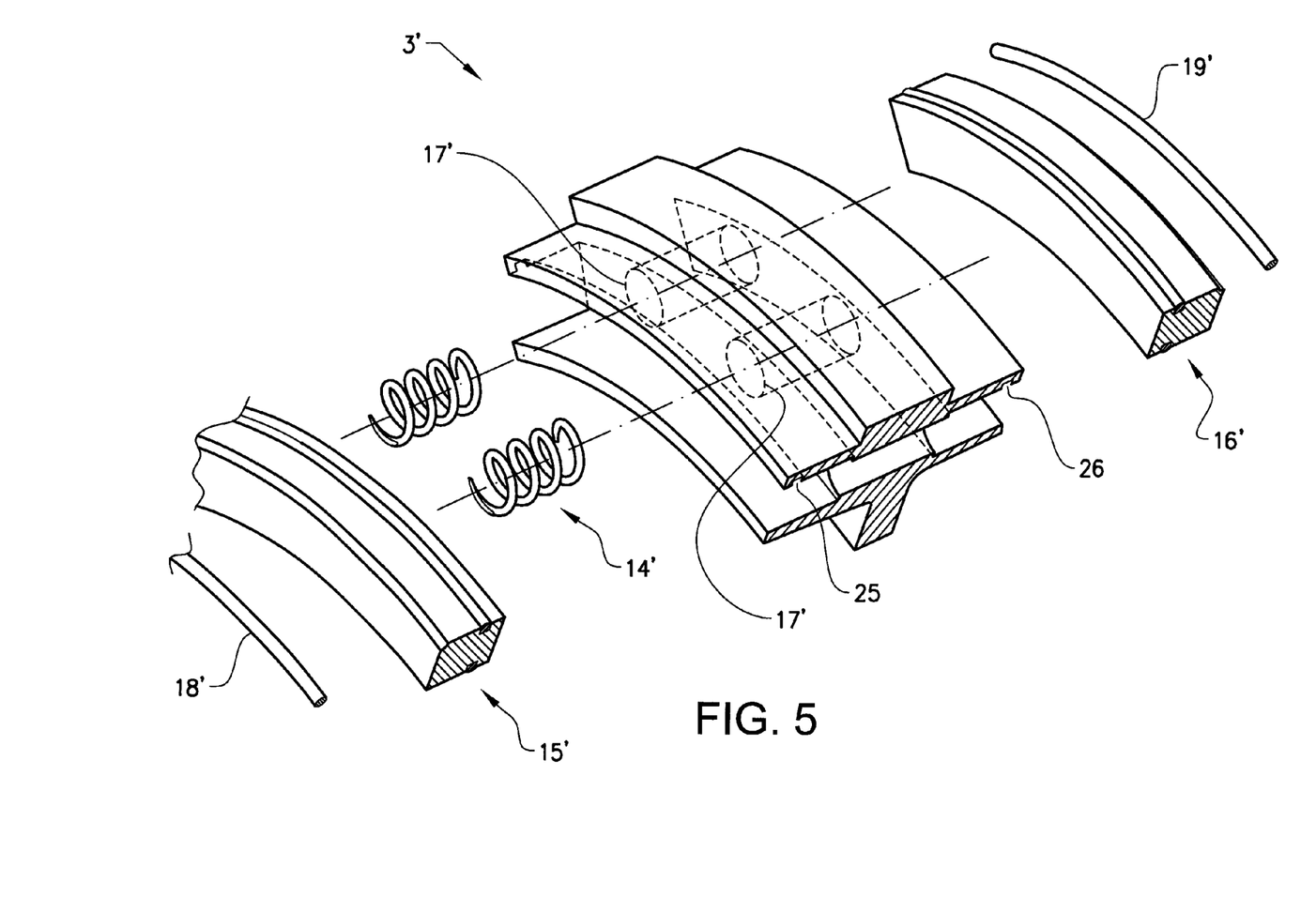
FIG. 5 is a perspective view of certain parts of the invention shown in a disassembled condition according to an alternative embodiment of the invention.

FIG. 5 is a perspective view which corresponds to that of FIG. 4 but which shows an alternative embodiment of the invention. According to this embodiment, the first return piston 15' and the second return piston 16' are not in the form of substantially cylindrically shaped components as shown in FIGS. 1-4 but are instead in the form of substantially annular elements. The pistons 15', 16' are arranged on opposite sides of a spring element 14'. In the embodiment illustrated in FIG. 5, the spring element 14' comprises a plurality of springs accommodated within a corresponding number of recesses 17' in the shift piston 3'. The springs are, positioned along the circumference of the shift piston 3'. The pistons 15', 16' preferably extend along the entire circumference of the shift piston 3'.

Furthermore, the spring element 14' is pretensioned between the pistons 15', 16' in a similar manner as in the embodiment described with reference to FIG. 4. A first stop element 18' is constituted by an annular locking ring arranged in a corresponding groove 25 of the shift piston 3'. The locking ring 18' preferably extends substantially around the entire circumference of the shift piston 3'.

In the same way a second stop element 19' is provided by means of annular locking ring arranged in a corresponding groove 26 of the shift piston 3'. The second locking ring 19' preferably extends substantially around the entire circumference of the shift piston 3'.

With reference to FIG. 5, in this embodiment there is a neutral position in which the first return piston 15' is forced by the spring element 14' against the first stop element 8', defining an end position for the first return piston 15' relative to the shift piston 3'. Also, the second return piston 16' is forced by the spring element 14' against the second stop element 19', defining an end position for the second return piston 16' relative to the shift piston 3'.

An important feature of the invention is that the neutral position is defined by the spring element 14 acting towards the first and second return pistons 15, 16. Hereby the first and second pistons are forced to their end positions relative to the shift piston 3, where the first return piston and the second return piston abut against the first and second stop elements of the shift piston, respectively.

In this state, the length L1 (see FIG. 2) over the first and second return pistons 15, 16 is slightly less than the length L2 between the opposite walls of the housing. In other words, the outer surfaces of the first and second return pistons 15, 16 will not touch the corresponding interior walls of the piston housing 4, at least not at the same time, when the shift piston 3 is in its neutral position as shown in FIG. 2. This means that the neutral position can be determined with high accuracy during manufacturing of the shift piston 3, the return pistons 15, 16, and housing. This is also in contrary to other prior art solutions in which other factors, such as the spring force of a spring element, determines the position of the shift piston 3. Also, the spring element 14 has a length which exceeds the distance between the first and second return pistons 5, 16 when said return pistons 15, 16 are in their respective end position.

Furthermore, the invention provides a solution which is advantageous from a safety point of view, due to the fact that the shift piston 3 will be forced to assume the neutral position—which corresponds to a condition in which no gear is engaged—in case there is a drop in hydraulic pressure. In such a situation, the force of the spring element 14 will force the return pistons 15, 16 towards their end positions so that the neutral position is assumed.

Figure 6:
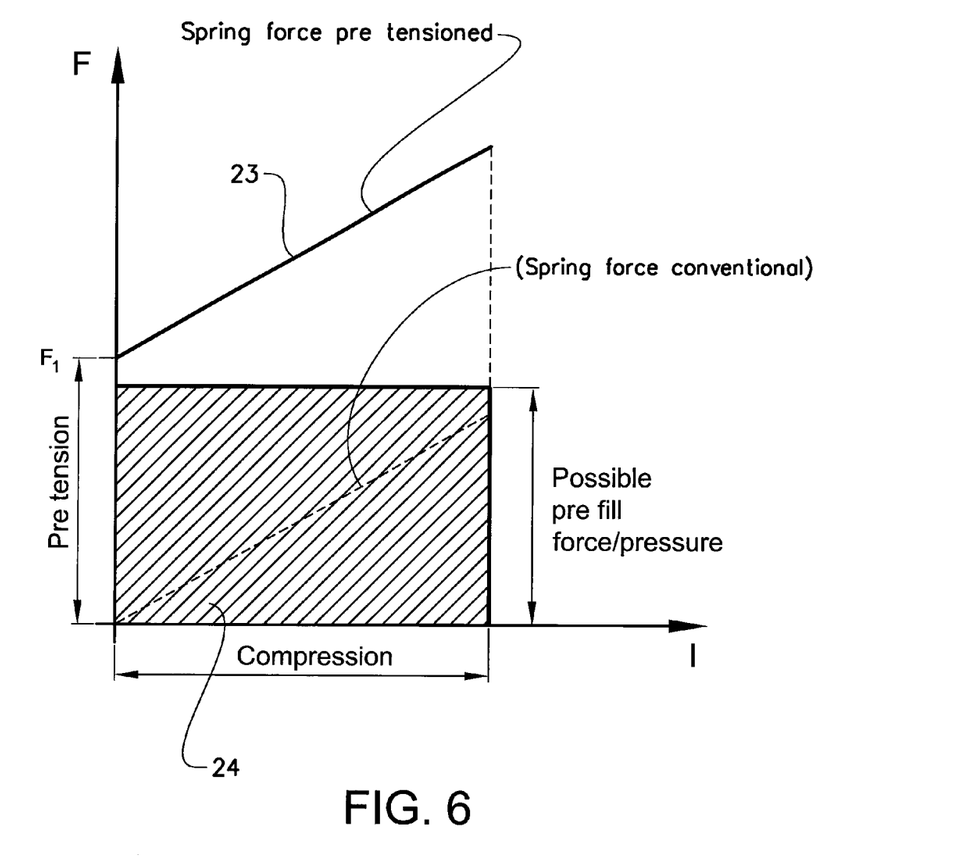
FIG. 6 is a diagram showing the principles of the invention for allowing a more optimal engagement of gears.

Furthermore, an important advantage relates to the fact that the pre-tensioning of the spring element 14 allows for a possibility to pre-fill the first inlet 20 or the second inlet 21 before an actual shifting is to be carried out. This principle is shown with reference to FIG. 6, which is a diagram indicating the relationship between the force (y axis) acting upon the shift piston 3 and the axial displacement (x axis) of the shift piston 3, i.e. the compression of the spring element 14. A first graph 23 indicates that the shift piston 3 will not be displaced until the pre-tensioning force Fi of the spring element 14 has been overcome by the force resulting from the hydraulic fluid in the first inlet 20. This gives a possibility to pre-fill the first inlet 20 for a wanted gear during a gear shift cycle. As long as the actuating pressure for the wanted gear is maintained below the corresponding force Fi provided by the pretensioned spring element 14, which is indicated schematically by means of a defined area 24 in FIG. 6, this pre-fill operation can be carried out without the shift piston 3 moving from its neutral position. When the actuating pressure is finally raised above the force for the spring element 14, the shifting is carried out. In this manner, shifting can be carried out very quickly.

The principles of pre-filling can alternatively be implemented in a manner so that not only the upcoming gear is prefilled (for example by introducing hydraulic liquid in the first inlet 20 in order to shift to the first gear position), but also in a manner in which there is a pre-fill of hydraulic liquid to force the shift piston 3 also to return to the neutral position. This "pre-fill for returning shift piston" also constitutes an advantage when it comes to providing quick gear switches.

The invention is not limited to the embodiments described above, but can be varied within the scope of the subsequent claims.

The invention claimed is:

1. A clutch arrangement comprising a shift piston and a piston housing, the shift piston being arranged to be displaced in an axial direction relative to the piston housing between at least one gear position and a neutral position, the clutch arrangement further comprising a spring element for forcing the shift piston towards the neutral position, wherein the clutch arrangement comprises a first return piston and a second return piston arranged on opposite sides of the spring element, and the spring element is accommodated within a recess of the shift piston, wherein in the neutral position the first return piston is forced by the spring element against a first stop element of the shift piston, defining an end position for the first return piston relative to the shift piston, and the second return piston is forced by the spring element against a second stop element of the shift piston, defining an end position for the second return piston relative to the shift piston, wherein the spring element is pretensioned between the first return piston and the second return piston such that the shift piston will not be displaced from the neutral position until a three acting upon the shift piston exceeds a pretensioning force of the spring element.

2. A clutch arrangement according to claim 1, wherein the shift piston is hydraulically actuated.

3. A clutch arrangement according to claim 1, wherein the shift piston is arranged to be displaced in an axial direction relative to a first gear and a second gear so that the shift piston has a first axial position in which it meshes with the first gear, a second axial position in which it meshes with the second gear and a third, neutral position.

4. A clutch arrangement according to claim 3, wherein it comprises a first inlet for hydraulic fluid, extending through the piston housing, the hydraulic fluid being arranged for forcing the shift piston towards the first axial position.

5. A clutch arrangement according to claim 3, wherein it comprises a second inlet for hydraulic fluid extending through the piston housing, the hydraulic fluid being arranged for forcing the shift piston towards the second axial position.

6. A clutch arrangement according to claim 3, wherein it comprises a third inlet for hydraulic fluid extending through the piston housing, the hydraulic fluid being fed into the internal recess and being arranged for forcing the shift piston towards the neutral position.

7. A clutch arrangement according, to claim 3, wherein the second return piston abuts against the piston housing when the shift piston has assumed the first axial position.

8. A clutch arrangement according to claim 3, wherein the first return piston abuts against, the piston housing when the shift piston has assumed the second axial position.

9. A clutch arrangement according to claim 3, wherein the first gear and the second gear are of the dog clutch type.

10. A clutch arrangement according to claim 1, wherein the recess extends along the axial direction through the shift piston.

11. A clutch arrangement according to claim 1, wherein each of the first return piston and second return piston is generally cylindrical.

12. A clutch arrangement according to claim 1, wherein each of the first and second return pistons has a section which extends out of the internal recess.

13. A clutch arrangement according to claim 1, wherein the first stop element is constituted by a first locking ring and the second stop element is constituted by a second locking ring, the locking rings (18, 19) being arranged in an internal surface of the internal recess.

14. A clutch arrangement according to claim 1, wherein each of the first return piston and second return piston is formed as a substantially annular element extending substantially along the entire circumference of the shift piston.

15. A vehicle comprising a clutch arrangement according to claim 1.

* * * * *